US009729017B2

United States Patent
Tanavde et al.

(10) Patent No.: US 9,729,017 B2
(45) Date of Patent: *Aug. 8, 2017

(54) DYNAMOELECTRIC MACHINE SUPPORT SYSTEM HAVING BOLTED SPRINGBAR

(71) Applicant: General Electric Company, Schenectady, NY (US)

(72) Inventors: Anand Shankar Tanavde, Slingerlands, NY (US); William Hunter Boardman, IV, Burnt Hills, NY (US); Christopher Michael Dahlberg, Albany, NY (US); David Norwood Dorsey, Clifton Park, NY (US); David Raju Yamarthi, Bangalore (IN)

(73) Assignee: General Electric Company, Schenectady, NY (US)

( * ) Notice: Subject to any disclaimer, the term of this patent is extended or adjusted under 35 U.S.C. 154(b) by 362 days.

This patent is subject to a terminal disclaimer.

(21) Appl. No.: 14/472,838

(22) Filed: Aug. 29, 2014

(65) Prior Publication Data

US 2014/0367971 A1    Dec. 18, 2014

Related U.S. Application Data

(63) Continuation-in-part of application No. 12/915,535, filed on Oct. 29, 2010, now Pat. No. 8,829,760.

(51) Int. Cl.
*H02K 1/18* (2006.01)
*H02K 5/24* (2006.01)

(52) U.S. Cl.
CPC .............. *H02K 1/185* (2013.01); *H02K 5/24* (2013.01)

(58) Field of Classification Search
CPC .......... H02K 1/18; H02K 1/185; H02K 1/187; H02K 1/28; H02K 1/30; H02K 5/24
See application file for complete search history.

(56) References Cited

U.S. PATENT DOCUMENTS

| 681,800 A | 9/1901 | Lasche |
|---|---|---|
| 2,199,141 A | 4/1940 | Rice |
| 2,199,156 A | 4/1940 | Grobel |

(Continued)

FOREIGN PATENT DOCUMENTS

| GB | 1162998 | 9/1969 |
|---|---|---|
| GB | 2470466 A | 11/2010 |

(Continued)

OTHER PUBLICATIONS

U.S. Appl. No. 13/934,192, Notice of Allowance dated May 25, 2016, 9 pages.

(Continued)

*Primary Examiner* — Christopher Verdier
*Assistant Examiner* — Christopher R Legendre
(74) *Attorney, Agent, or Firm* — Ernest G. Cusick; Hoffman Warnick LLC

(57) ABSTRACT

A support system for a dynamoelectric machine is disclosed. In one embodiment, the support system includes: a mounting pad having a first face and a second face, the second face including a pair of slots; a pair of spring bars bolted to the mounting pad at the pair of slots; a collar welded or brazed to the first face of the mounting pad; and a key bar between and affixed to the pair of spring bars.

7 Claims, 11 Drawing Sheets

(56) References Cited

U.S. PATENT DOCUMENTS

| | | | |
|---|---|---|---|
| 2,199,351 A | 4/1940 | Taylor | |
| 2,424,299 A | 7/1947 | Baudry et al. | |
| 2,489,109 A | 11/1949 | Shildneck et al. | |
| 2,554,226 A | 5/1951 | Taylor | |
| 2,561,994 A | 7/1951 | Rashevsky et al. | |
| 2,811,658 A | 10/1957 | Brainard | |
| 2,811,659 A | 10/1957 | Barlow et al. | |
| 2,846,603 A | 8/1958 | Webster et al. | |
| 3,462,624 A | 8/1969 | Darrieus | |
| 3,531,667 A | 9/1970 | Barton et al. | |
| 3,652,889 A | 3/1972 | Reece et al. | |
| 3,708,707 A | 1/1973 | Kranz | |
| 3,988,622 A | 10/1976 | Starcevoc | |
| 4,110,652 A | 8/1978 | McGahern | |
| 4,204,313 A | 5/1980 | Khutoretsky et al. | |
| 4,425,523 A | 1/1984 | Detinko et al. | |
| 4,469,973 A | 9/1984 | Guyot et al. | |
| 4,536,671 A | 8/1985 | Miller | |
| 4,634,909 A | 1/1987 | Brem | |
| 4,663,553 A | 5/1987 | Zimmermann | |
| 4,891,540 A | 1/1990 | Cooper et al. | |
| 4,894,573 A | 1/1990 | Simpson | |
| 5,796,191 A | 8/1998 | Schwanda | |
| 5,875,540 A | 3/1999 | Sargeant et al. | |
| 6,104,116 A | 8/2000 | Fuller et al. | |
| 6,144,129 A | 11/2000 | Fuller et al. | |
| 6,321,439 B1 | 11/2001 | Berrong et al. | |
| 6,346,760 B1 | 2/2002 | Boardman, IV | |
| 6,498,417 B2 | 12/2002 | Fuller | |
| 6,628,027 B2 | 9/2003 | Fuller | |
| 6,720,699 B1 | 4/2004 | Shah et al. | |
| 6,775,900 B2 | 8/2004 | Dawson et al. | |
| 7,202,587 B2 | 4/2007 | Sargeant et al. | |
| 7,302,754 B2 | 12/2007 | Majernik et al. | |
| 7,353,586 B2 | 4/2008 | Majernik et al. | |
| 7,397,163 B2 | 7/2008 | Cook et al. | |
| 7,714,477 B2 | 5/2010 | Nagashima et al. | |
| 7,827,676 B2 | 11/2010 | Allen et al. | |
| 7,923,890 B2 | 4/2011 | Boardman, IV et al. | |
| 7,923,891 B2 | 4/2011 | Kikuichi | |
| 7,946,028 B2 | 5/2011 | Majernik et al. | |
| 8,040,014 B2 | 10/2011 | Boardman, IV et al. | |
| 8,138,654 B2 | 3/2012 | Boardman, IV | |
| 8,258,680 B2 | 9/2012 | Tanavde et al. | |
| 8,319,405 B2 | 11/2012 | Allen et al. | |
| 8,829,760 B2 * | 9/2014 | Tanavde | H02K 1/185 310/216.113 |
| 8,941,282 B2 | 1/2015 | Allen et al. | |
| 9,531,224 B2 * | 12/2016 | Hugh Sam | H02K 1/185 |
| 2002/0135244 A1 | 9/2002 | Strong et al. | |
| 2011/0109187 A1 | 5/2011 | Tanavde et al. | |
| 2011/0210643 A1 | 9/2011 | Tanavde et al. | |
| 2012/0043861 A1 | 2/2012 | Allen et al. | |
| 2012/0104760 A1 * | 5/2012 | Tanavde | H02K 1/185 290/52 |
| 2014/0015356 A1 | 1/2014 | Chamberlin | |
| 2014/0367971 A1 * | 12/2014 | Tanavde | H02K 1/185 290/52 |
| 2015/0171715 A1 * | 6/2015 | Pettit | H02K 5/00 310/216.113 |
| 2015/0171719 A1 * | 6/2015 | Pettit | H02K 5/00 310/216.113 |

FOREIGN PATENT DOCUMENTS

| | | |
|---|---|---|
| GB | 2470467 A | 11/2010 |
| GB | 2740466 A | 11/2010 |
| GB | 2475599 A | 5/2011 |
| GB | 2478191 A | 8/2011 |
| JP | S54162107 | 12/1979 |
| JP | 55086348 A | 6/1980 |
| JP | 61049629 | 3/1986 |
| JP | S61244238 | 10/1986 |
| JP | 62260538 A | 11/1987 |
| JP | 2007166726 A | 6/2007 |
| WO | 0057535 A1 | 9/2000 |

OTHER PUBLICATIONS

U.S. Appl. No. 13/934,192, Office Action 1 dated Feb. 17, 2016, 29 pages.
U.S. Appl. No. 14/089,742, Office Action 1 dated Mar. 29, 2016, 47 pages.
U.S. Appl. No. 13/934,189, Notice of Allowance dated Dec. 11, 2015, 30 pages.
LeGendre, Christopher Ryan, Notice of Allowance for U.S. Appl. No. 12/915,535, dated Apr. 30, 2014, 13 pages.
Dywidag-Systems International, "Dywidag Post-Tensioning Systems; Multistrand Systems; Bar Systems; Repair and Strengthening," Apr. 2006, 31 pages, retrieved from: http://www.dsiamerica.com/uploads/media/DSI-USA_Bonded-Post-Tensioning-Systems_us_01.pdf.
Amsysco, "Material Properties of Post-Tension Strands," Jan. 2010, 3 pages, retrieved from: http://www.amsyscoinc.com/2010/01/29/material-properties-of-post-tension-strands/.
Post-Tensioning Institute, "What is Post-Tensioning?," Dec. 2000, 2 pages, retrieved from: http://www.dsiamerica.com/uploads/media/DSI-USA_What_is_Post-Tensioning_us_02.pdf.
VSL, "VSL Post-Tensioning Technology," 2013, 10 pages, retrieved from: http://www.vsl.com/index.php?option=com_content&task=blogcategory&id=17&itemid=86.
Tensioning Materials for Prestressed Concrete, "Ultra-high Strength Prestressing Strand," 1 page, from: http://www.sei-ssw.co.jp/en/pdf/prestressed_concrete_catalog_05.pdf.
Sumitomo Electric, "Super-High_Tension Prestressed Concrete Strand 15.7 mm in Diameter," 2013, 2 pages, "SEI News," vol. 414, retrieved from: http://global-sei.com/sn/2012/414/3a.html.
Great Britain Intellectual Property Office, Search Report for Application No. GB1018954.6 dated Aug. 4, 2011, 3 pages.
Mullins, Office Action Communication for U.S. Appl. No. 12/622,751 dated Jan. 7, 2011, 11 pages.
Mullins, Office Action Communication for U.S. Appl. No. 12/622,751 dated May 20, 2011, 13 pages.
Mullins, Notice of Allowance and Fee(s) Due for U.S. Appl. No. 12/622,751 dated Jul. 18, 2011, 11 pages.
Legendre, Office Action Communication for U.S. Appl. No. 12/915,535 dated Sep. 18, 2013, 60 pages.
Great Britain Intellectual Property Office, Search Report for Application No. GB1103083.0 dated Jun. 24, 2011, 4 pages.
Andrews, Office Action Communication for U.S. Appl. No. 12/713,505 dated Jun. 21, 2011, 24 pages.
Great Britain Intellectual Property Office, Search Report for Application No. GB1018954.6 dated Mar. 9, 2011, 5 pages.
Legendre, Notice of Allowance and Fees Due for U.S. Appl. No. 12/915,535 dated Dec. 18, 2013.
U.S. Appl. No. 14/089,742, Notice of Allowance dated Sep. 9, 2016, 19 pages.

* cited by examiner

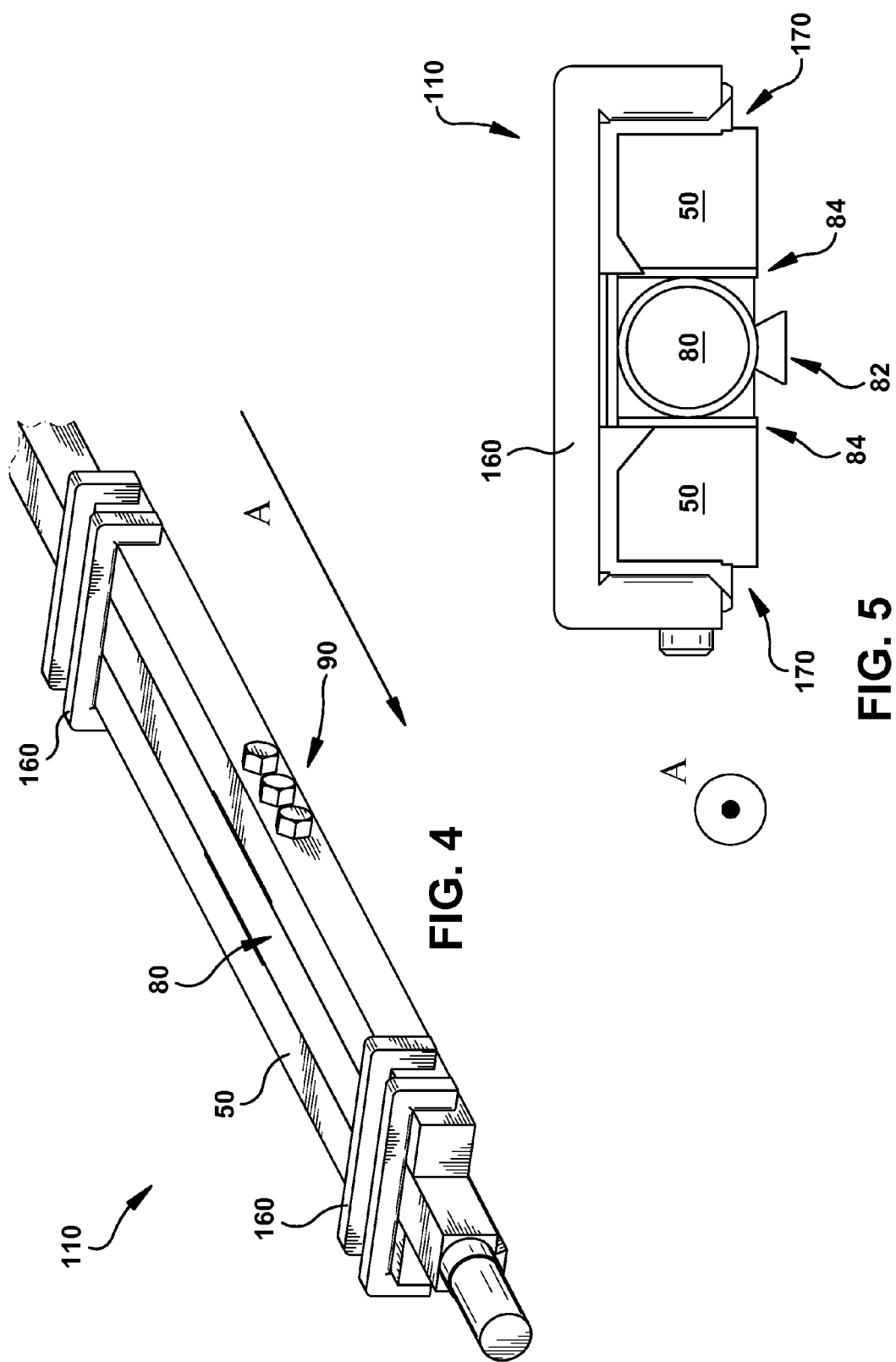

DYNAMOELECTRIC MACHINE SUPPORT SYSTEM HAVING BOLTED SPRINGBAR

CROSS-REFERENCE TO RELATED APPLICATION

This application is a continuation-in-part of currently pending U.S. patent application Ser. No. 12/915,535, which is currently pending, and received a Notice of Allowance on Apr. 30, 2014.

BACKGROUND OF THE INVENTION

The subject matter disclosed herein relates to a dynamoelectric machine. More specifically, the subject matter disclosed herein relates to a support system for a dynamoelectric machine.

A stator of a dynamoelectric machine, such as an electric power generator, generally includes a stator core and a stator frame. The stator core typically has a cylindrical shape and includes a stack of insulated steel laminations. Each lamination is a segment of a full circle that has slots on its inner diameter to accommodate a stator winding and dovetail slots on its outer diameter. The stator frame has a plurality of key bars connected thereto; each key bar having a dovetail to provide structural support for the stator core. The key bars are traditionally coupled to spring bars, which are bolted to section pads. The section pads are directly welded to section plates.

The spring bars are machined to include a relief cut, which enables stiffness tuning of the suspension system, and the section pads are machined to allow the suspension system to wrap around the circumference of the stator frame. These traditional configurations may involve costly, high-strength materials that may be resistant to welding, as well as expensive assembly processes.

BRIEF DESCRIPTION OF THE INVENTION

A support system for a dynamoelectric machine is disclosed. In one embodiment, the support system includes: a mounting pad having a first face and a second face, the second face including a pair of slots; a pair of spring bars bolted to the mounting pad at the pair of slots; a collar welded or brazed to the first face of the mounting pad; and a key bar between and affixed to the pair of spring bars.

A first aspect of the invention provides for a support system including: a mounting pad having a first face and a second face, the second face including a pair of slots; a pair of spring bars bolted to the mounting pad at the pair of slots; a collar welded or brazed to the first face of the mounting pad; and a key bar between and affixed to the pair of spring bars.

A second aspect of the invention provides for a dynamoelectric apparatus comprising: a rotor; and a stator substantially surrounding the rotor, the stator including: a support system comprising: a mounting pad having a radially outward face and a radially inward face, the radially inward face including a pair of slots; a pair of spring bars bolted to the mounting pad at the pair of slots; a collar welded or brazed to the radially outward face of the mounting pad; and a key bar between and affixed to the pair of spring bars.

A third aspect of the invention provides for a power generation system comprising: a turbine; a rotor coupled to the turbine; and a stator substantially surrounding the rotor, the stator including: a support system comprising: a mounting pad having a radially outward face and a radially inward face, the radially inward face including a pair of slots; a pair of spring bars bolted to the mounting pad at the pair of slots; a collar welded or brazed to the radially outward face of the mounting pad; and a key bar between and affixed to the pair of spring bars.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 4 shows a three-dimensional perspective view of a portion of a dynamoelectric machine support system according to an embodiment of the invention.

FIG. 5 shows an end view of a portion of a portion of a dynamoelectric machine support system according to an embodiment of the invention.

It is noted that the drawings of the invention may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide for a support system (or, suspension system) for a dynamoelectric machine. More specifically, aspects of the invention include a support system providing assistance in isolating dynamoelectric machine stator core vibrations.

Traditional dynamoelectric machine support systems include a stator frame having a plurality of key bars connected thereto, each key bar having a dovetail to provide structural support for the stator core. The key bars are traditionally coupled to spring bars, which are bolted to section pads. The section pads are directly welded to section plates. These support systems may help to isolate vibrations in e.g., the stator core.

The spring bars are machined to include relief cuts, which enables stiffness tuning of the support system, and the section pads are machined to allow the suspension system to wrap around the circumference of the stator frame. The inner diameter (the portion facing radially inward on an assembled dynamoelectric machine) of each section pad is traditionally machined using a vertical boring machine to allow the suspension system to wrap around the stator circumference. Additionally, in order to allow for flexibility of the spring bars, the relief cuts are made in portions of the spring bars not bolted to the section pads. Machining of the spring bars and section pads may be time consuming and costly. Additionally, traditional suspension systems require the use of high-strength materials (e.g., having a tensile strength of over 95 Kpsi), due to their design and the machining required. These high-strength materials may be costly, and may also be difficult to machine and/or weld.

Figure 1:
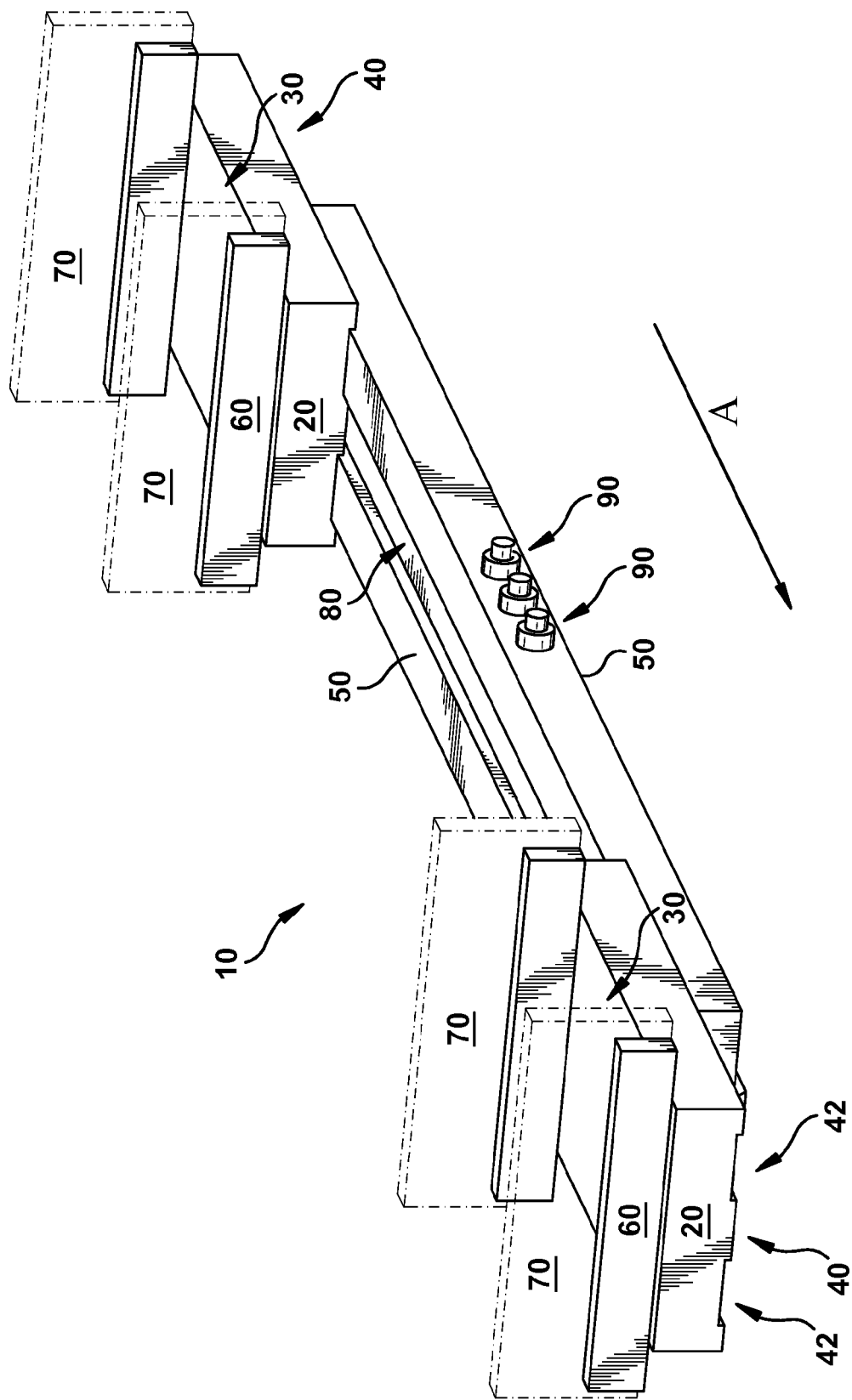
FIG. 1 shows a three-dimensional perspective view of a portion of a dynamoelectric machine support system according to an embodiment of the invention.
Figure 2:
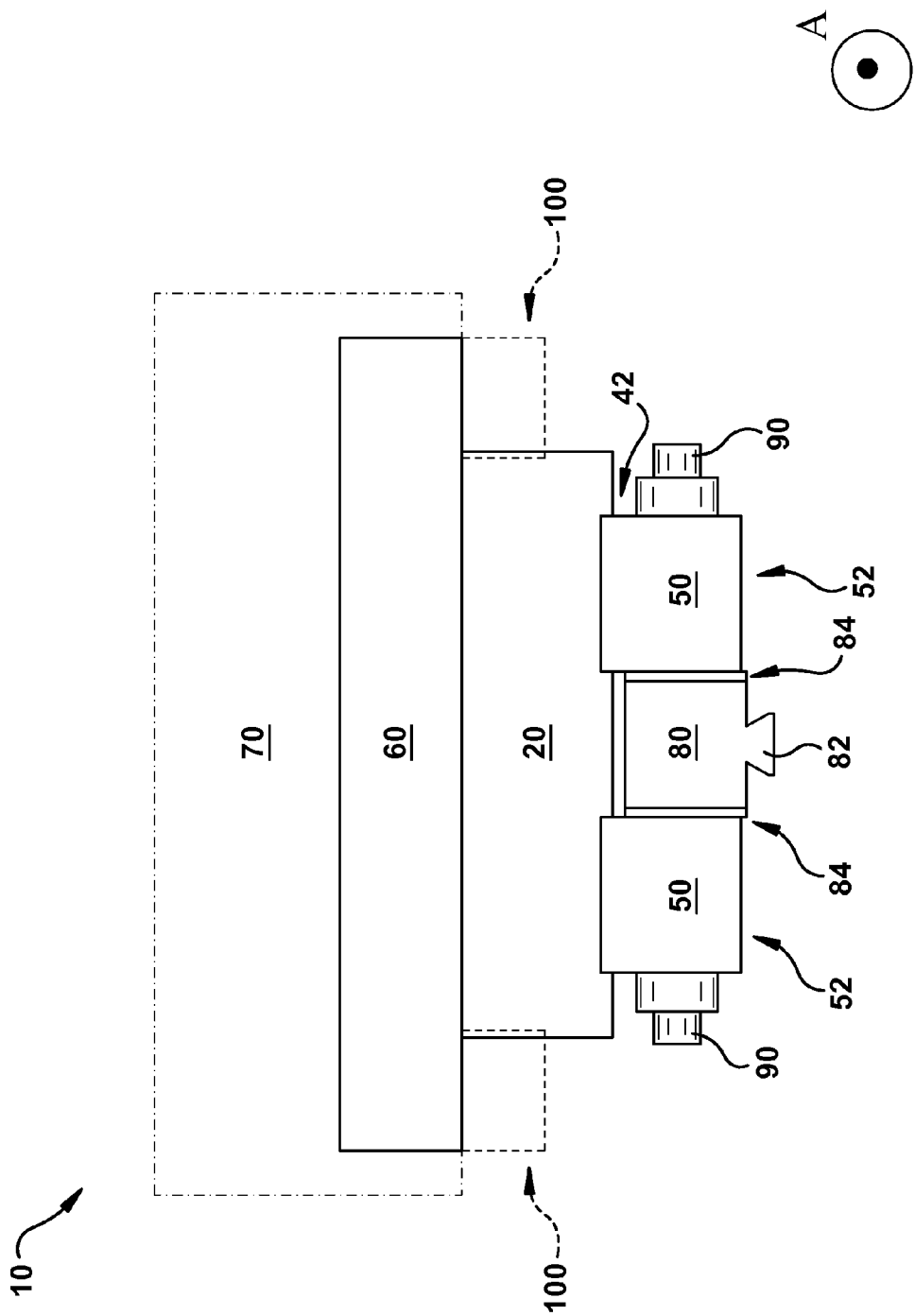
FIG. 2 shows an end view of a portion of a portion of a dynamoelectric machine support system according to an embodiment of the invention.
Figure 3:
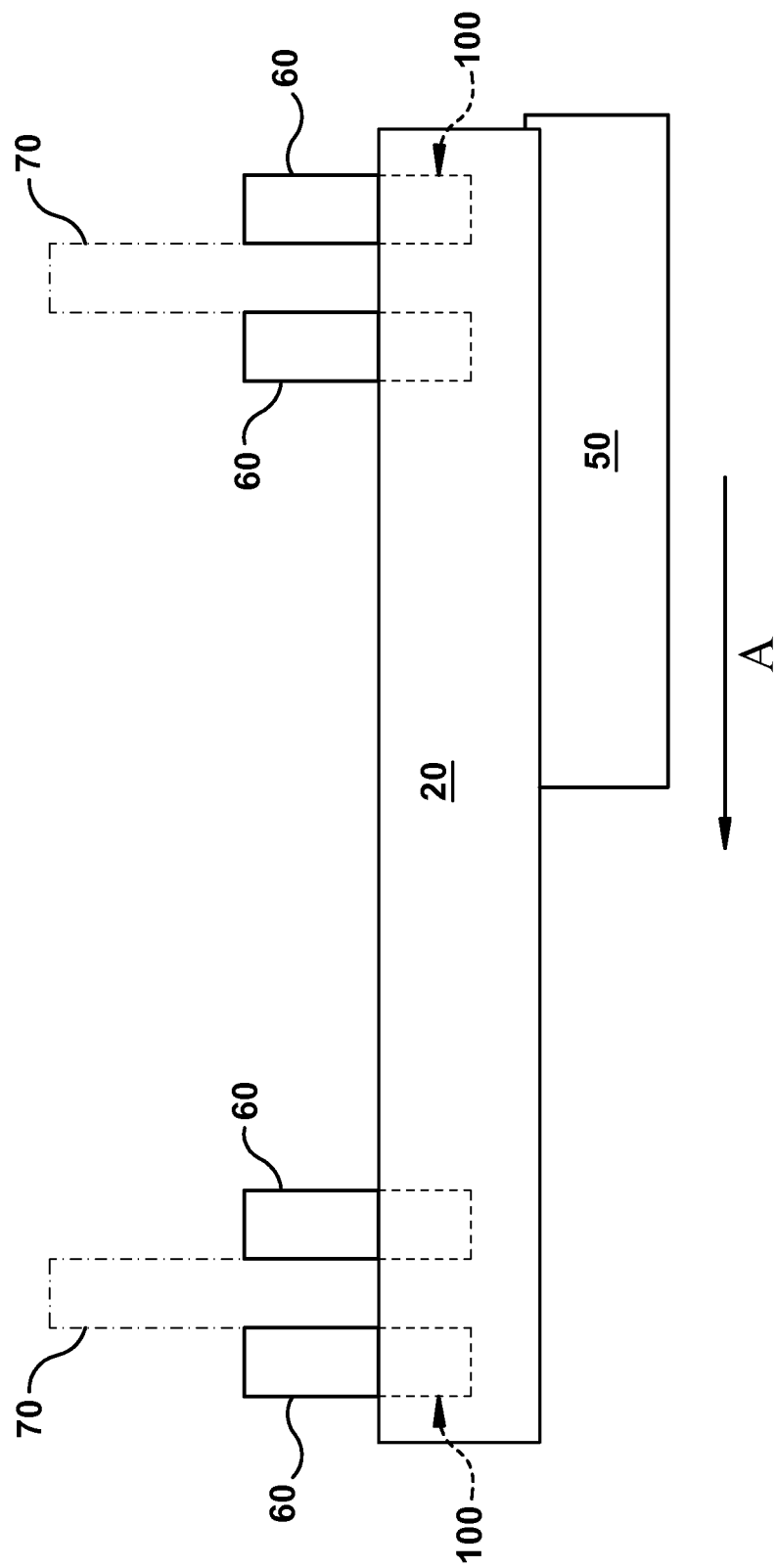
FIG. 3 shows a side view of a portion of a portion of a dynamoelectric machine support system according to an embodiment of the invention.

In contrast to traditional dynamoelectric machine suspension systems, aspects of the invention provide for a dynamoelectric machine suspension system requiring less machining and lower-cost materials. In one embodiment, the suspension system may include: a mounting pad having a first face and a second face, the second face including a pair of slots; a pair of spring bars welded (or, alternatively, brazed) to the mounting pad at the slots; a collar welded (or, alternatively, brazed) to the first face of the mounting pad; and a key bar between and affixed to the pair of spring bars. Turning to FIG. 1, a portion of a dynamoelectric machine support system (or, support system) 10 is shown. In this embodiment, support system 10 includes a mounting pad 20 having a first face 30 and a second face 40. In one embodiment, second face 40 includes a pair of slots 42. Support system 10 may further include a pair of spring bars 50 welded (or brazed) to mounting pad 20 at slots 42 (weld or braze joints not visible from this perspective view). Also shown included in support system 10 is a collar 60 welded (or brazed) to first face 30 of mounting pad 20, collar 60 providing a weld (or braze) connection between first face 30 of mounting pad 20 and a portion of an annular section plate 70 (or, section plate 70, shown in phantom as actually part of stator frame skeleton, shown in FIG. 5). It is understood that while section plate 70 is shown in FIGS. 1-3 as part of support system 10, that section plate 70 may actually be a portion of an annularly extending section plate attached to the other components described in support system 10 after collar 60 is welded to mounting pad 20. That is, as will be explained further herein, portions of support system 10 may be affixed to a dynamoelectric machine stator frame skeleton (FIG. 5) including one or more annularly extending section plates 70 after attachment assembly of spring bars 50 with mounting pad 20, and mounting pad 20 with collar 60. In one embodiment, collar 60 may be formed of a substantially longitudinal member extending perpendicularly across mounting pad 20 (and substantially perpendicular with the axial axis, "A", with runs parallel to the axis of a rotor, shown in FIG. 6). It is understood that in other embodiments, collar 60 may include one or more additional perpendicular members (creating a "U-shaped" collar as in FIG. 2). However, in these alternative embodiments, the "U-shaped" collar may require additional welding or brazing (and cause additional material distortion issues) as compared to the embodiment shown and described with reference to FIG. 1. Support system 10 may also include a key bar 80 located between and affixed to spring bars 50. Key bar 80 may include a dovetail 82 (not shown), and be affixed to spring bars 50 via one or more attachment mechanisms (e.g., nut/bolt, screw, pin, fastener, etc.) 90.

Figure 6:
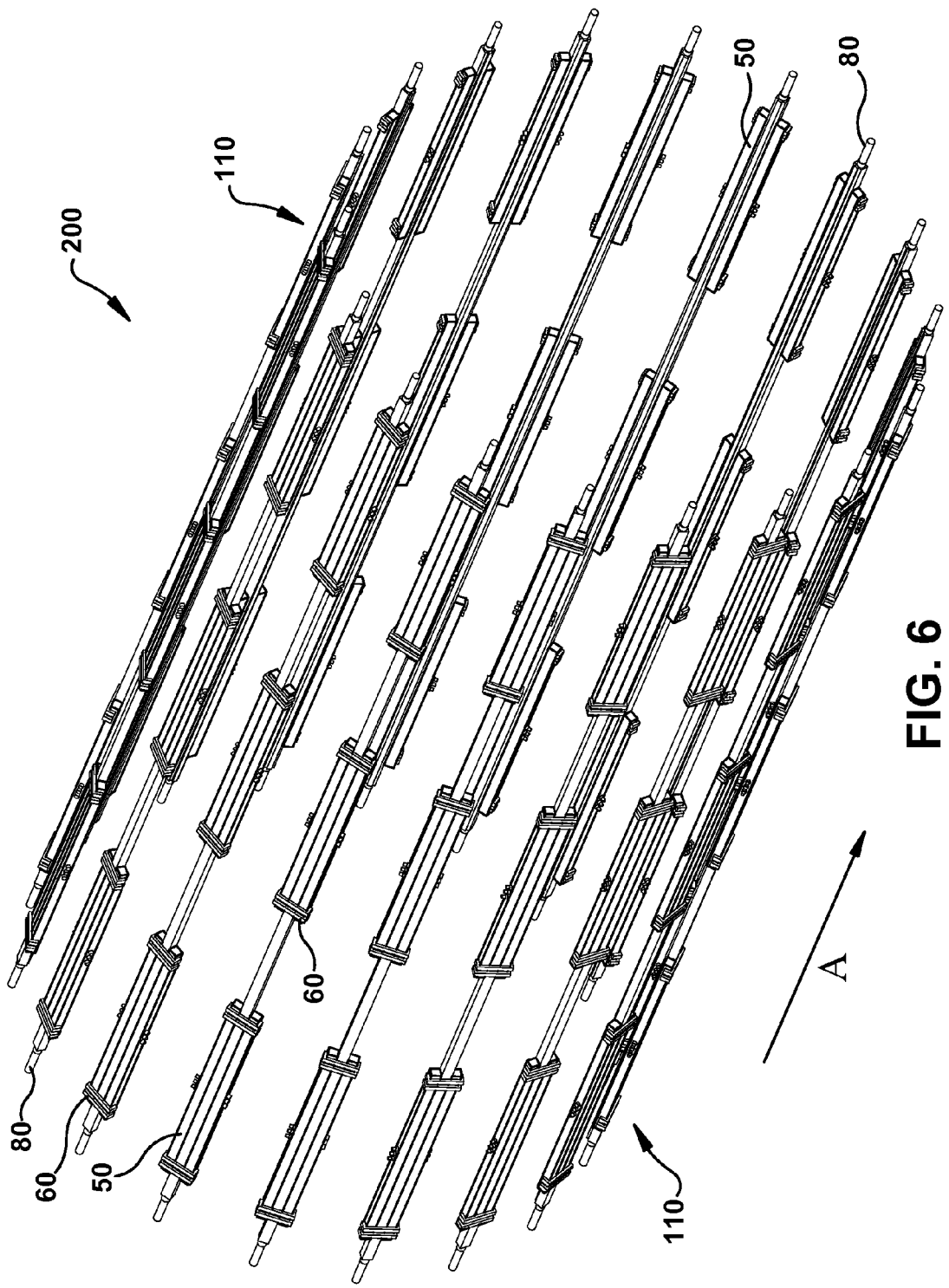
FIG. 6 shows a three-dimensional perspective view of an isolated dynamoelectric machine support system according to an embodiment of the invention.

Turning to FIGS. 2-3, a close-up end view of support system 10, and a close-up side view of a portion of support system 10, respectively, are shown according to embodiments. As shown in FIG. 2, key bar 80 may include dovetail 82, which is configured to engage with portions of a stator core (FIG. 6). Shown in FIGS. 2 and 3 is an alternate collar configuration including at least one perpendicular member 100 continuous with the longitudinal portion of collar 60. In one embodiment, collar 60 including the perpendicular member 100 may be formed from one continuous piece of metal, e.g. via cutting or machining. In another embodiment, collar 60 and perpendicular member 100 may be separately attached and welded (or, alternatively, brazed) to mounting pad 20 (and later, to section plate 70). In one embodiment, perpendicular member 100 may be welded (or, alternatively, brazed) to a face (e.g., a side) of mounting pad 20 distinct from first face 30 and second face 40.

Also illustrated in FIG. 2, each spring bar 50 may substantially complement each slot 42 of mounting pad 20. That is, each spring bar 50 may be shaped to substantially fill each slot 42 of mounting pad 20, with only nominal clearance between interior faces of spring bars 50 and each respective slot 42. Also shown in FIG. 2, in one embodiment, key bar 80 is affixed to spring bars 50 via at least one bolt 90. In one embodiment, a bolt 90 may extend through a first spring bar 50, key bar 80 and a second spring bar 50, respectively. It is understood that adjustment of key bar 80 with respect to spring bars 50 may be performed via manipulation of one or more shims 84, which may be machined to allow key bar 80 to fit securely between spring bars 50.

Turning to FIGS. 4 and 5, an alternative embodiment of a portion of a support system 110 is shown in a perspective three-dimensional view (FIG. 4) and end view (FIG. 5), respectively. In this embodiment, support system 110 does not include a mounting pad (e.g., mounting pad 20 in FIGS. 1-3), and a collar 160 is welded (or, alternatively, brazed) directly to spring bars 50 and key bar 80. In this case, collar 160 may include a "U-shaped" or "C-shaped" configuration welded to adjacent sides of each spring bar 50, respectively. In this respect, collar 160 may take a substantially similar shape as collar 60 including perpendicular members 100 (shown and described with reference to FIGS. 2-3). FIG. 5 illustrates welds 170 used to secure collar 160 directly to adjacent sides of each spring bar 50. In one embodiment, welds 170 may be J-groove, V-groove or other suitable welds to allow for affixing of spring bars to collar 160. It is understood that key bar 80 may be inserted between spring bars 50 after welds 170 have been formed, and that the position of key bar 80 may be adjusted between spring bars 50 using one or more shims 84. Shims 84 may be machined to allow for adjustment of the position of key bar 80 between spring bars 50 before affixing of key bar 80 and spring bars 50 (e.g., using affixing mechanisms 90 such as bolts, screws, pins, etc.).

Turning to FIG. 6, a three-dimensional perspective view of an isolated dynamoelectric machine support system 200 is shown according to an embodiment. In this view, the isolated support system 200 may include a plurality of support structures (similar to support structure 10) arranged according to their orientation in a dynamoelectric machine (not shown). That is, a plurality of key bars 80 may be arranged around an inner circumference of a dynamoelectric machine, where each key bar 80 has its primary axis arranged parallel to the axial axis (A) of the dynamoelectric machine. In other words, support system 200 may include a ring of axially-extending key bars 80, portions of which may be supported by members described with reference to the support structures of FIGS. 1-3. It is understood that support systems 110 of support system 200 may be individually pre-assembled (e.g., pre-welded) before being mounted within a skeleton (e.g., dynamoelectric machine stator frame skeleton 300, FIG. 7).

Figure 7:
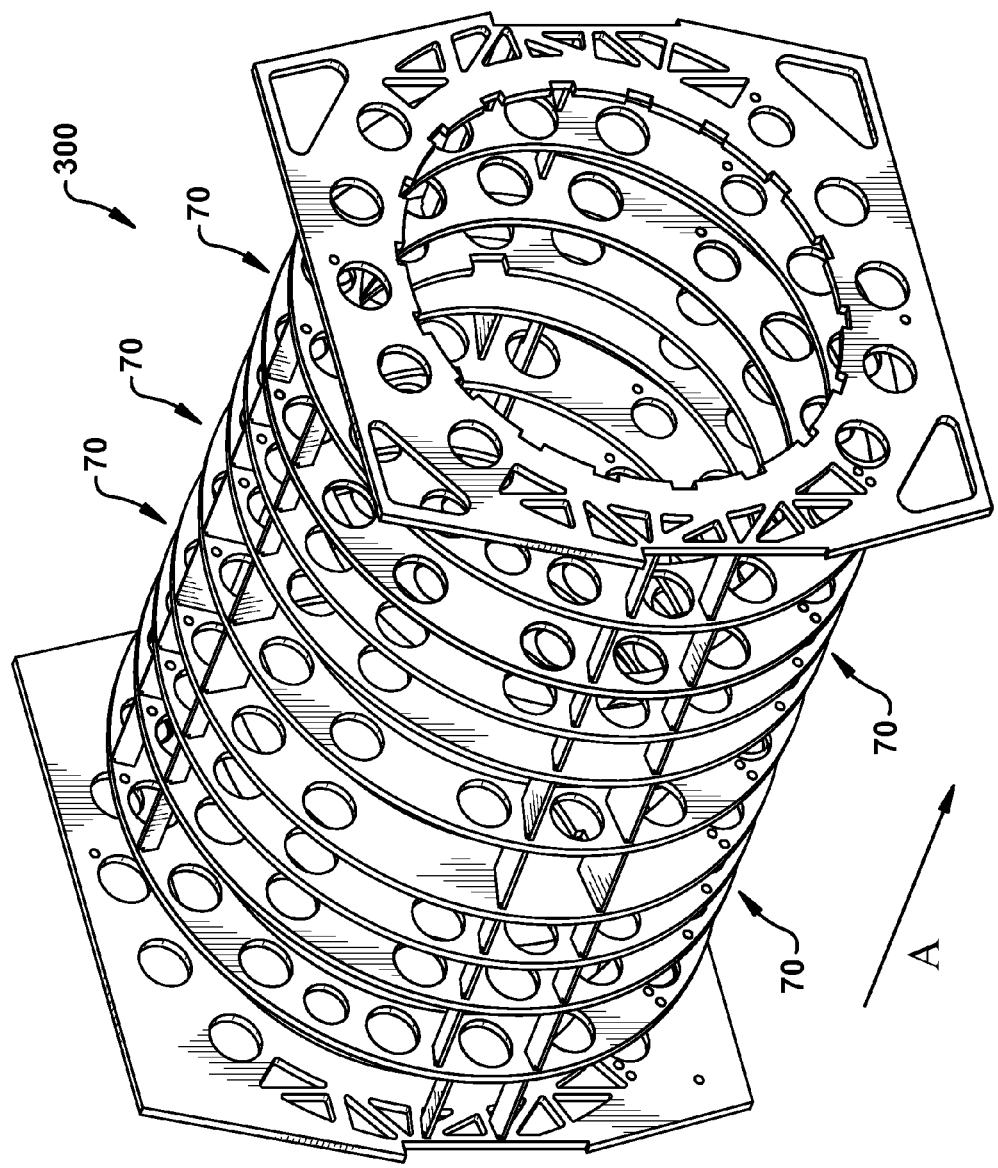
FIG. 7 shows a three-dimensional perspective view of a dynamoelectric machine stator frame skeleton according to an embodiment of the invention.

Turning to FIG. 7, and with continuing reference to FIG. 6, a perspective view of a dynamoelectric machine stator frame skeleton (or, skeleton) 300 is shown according to an embodiment. The skeleton 300 may include a plurality of section plates 70, which when skeleton 300 is substantially fully assembled, form a ring-shaped structure inside which support system 200 (FIG. 6) may be arranged and assembled. That is, support system 200 (FIG. 6), including collars 60, may be arranged inside skeleton 300 and e.g., welded to section plates 70 to form a support system for the dynamoelectric machine. It is understood that one or more portions of support system 200 may be arranged and assembled inside of skeleton 300 at a time. Further, one or more segments of a key bar 80, and one or more support structures 10 may be arranged and assembled within skeleton 300 at a time.

In any case, support structure 10 (and similarly, support system 200) may allow for the use of lower strength materials in forming a support system for a dynamoelectric machine than used in conventional support systems. That is, due to the reduction in the amount of bolted connections (e.g., elimination of bolt connections between spring bar 50 and pad 20), and the use of welds (or, alternatively, braze joints), a material having a tensile strength of approximately 70 Kpsi or less may be suitable for a spring bar 50 affixed to mounting pad 20. For example, spring bar 50 may be formed of a material such as A36 steel, having a tensile strength of approximately 60-70 Kpsi or less, or AISI C1018 carbon steel, having a tensile strength of approximately 70 Kpsi or less. Additionally, distinct portions of a support system (e.g., support system 200 of FIG. 6) may be assembled in controlled environments (e.g., separately), thereby allowing for higher weld quality (and improved weld lifetime) as compared to conventional support systems requiring use of a vertical boring machine. Additionally, by eliminating the use of a vertical boring machine manufacture and assembly costs of a support system 200 may be reduced.

Additionally, with reference to the FIGS. 1-3, but with particular reference to FIG. 2, it should be understood that mounting pad 20 may be formed as a block with a plurality of slots (e.g., two) 42 formed therein. Forming of mounting pad 20 according to embodiments of the invention may be performed without the use of a vertical boring machine, as is used in forming conventional mounting pads. That is, the second face 40 of mounting pad 20 need not be machined to form an arcuate surface as with the mounting pad of conventional support systems. This is because slots 42 allow the collective exposed surfaces 52 of spring bars 50 to arc with the overall shape of support system 200, where it is understood that each pair of spring bars 50 will not share the same plane across their radially outward surfaces (e.g., those surfaces complementing and substantially filling slots 42).

Figure 8:
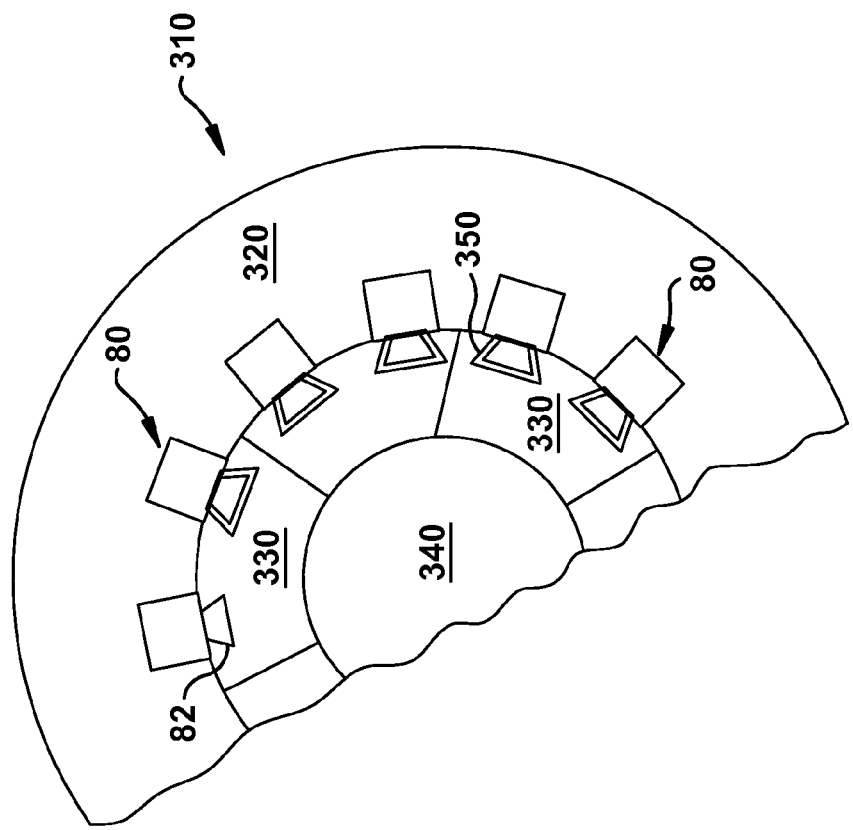
FIG. 8 shows a simplified partial cross-sectional schematic view of a dynamoelectric apparatus according to an embodiment of the invention.

Turning to FIG. 8, a simplified partial cross-sectional schematic view of a dynamoelectric apparatus 300 is shown according to an embodiment of the invention. In particular, dynamoelectric apparatus 300 is shown including a stator 310 having a stator wrapper 320 surrounding a stator core 330 (shown as stacked lamination segments). Dynamoelectric apparatus 300 is further shown including a rotor 340 surrounded by stator 310. Also shown are a plurality of key bars 80 having dovetail sections 82, which may be substantially similar to the key bars 80 having dovetail sections 82 described herein. Other portions of the support structure 10 (as well as support system 200 and skeleton 300) are omitted from this depiction of dynamoelectric apparatus 300 for clarity. However, it is understood that other portions of support structure 10, support system 200 and skeleton 300 may be substantially contained within stator wrapper 320. As shown, stator core 330 may have a plurality of key bar slots 350 for receiving dovetail sections 82 of key bars 80 and providing connection between stator wrapper 320 and stator core 330. Operation of dynamoelectric apparatus 300, which may include, e.g., an electric generator or motor, is not described herein for brevity, however, it is understood that a dynamoelectric apparatus employing the teachings described herein may function substantially similarly as conventional dynamoelectric apparatuses.

Figure 9:
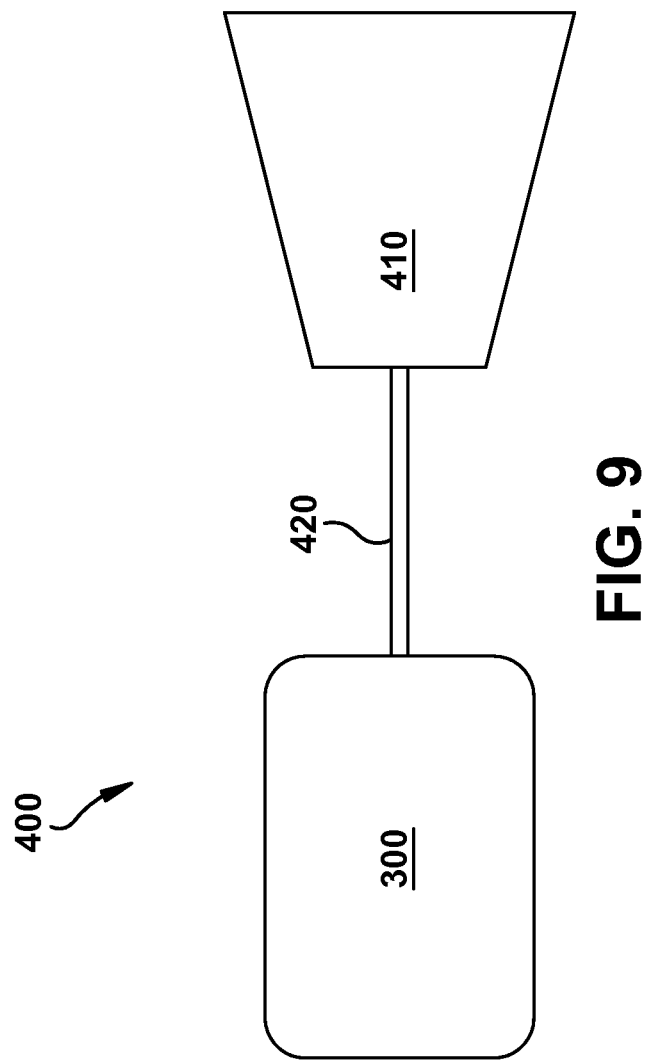
FIG. 9 shows components included in a power generation system according to an embodiment of the invention.

FIG. 9 shows components included in a power generation system 400 according to an embodiment of the invention. Power generation system 400 may include a dynamoelectric apparatus 300, a turbine 410, and a shaft 420 coupling turbine 410 and dynamoelectric apparatus 300. Turbine 410 may be any conventional steam or gas turbine. Further turbine 410 may represent a plurality of turbine systems, such as multiple steam turbine sections including one or more of a high pressure section, intermediate pressure section and low pressure section. Other components included in conventional turbine systems (e.g., condensers, heat recovery steam generator sections, etc.) have been omitted for clarity. In one embodiment, where dynamoelectric apparatus 300 includes an electric generator, turbine 410 may generate rotational motion via the flow of steam or hot gas across turbine blades (not shown). This rotational motion may be transferred to dynamoelectric apparatus 300 via shaft 420, which may in turn transfer the rotational motion to rotor 340 (FIG. 8). Rotation of rotor 340 inside dynamoelectric apparatus 300 may, e.g., generate electricity for use in homes, business, etc. It is also understood that rotational motion from dynamoelectric apparatus 300 may be transferred to turbine 410 via shaft 420, for example, during start-up of turbine 410.

Figure 10:
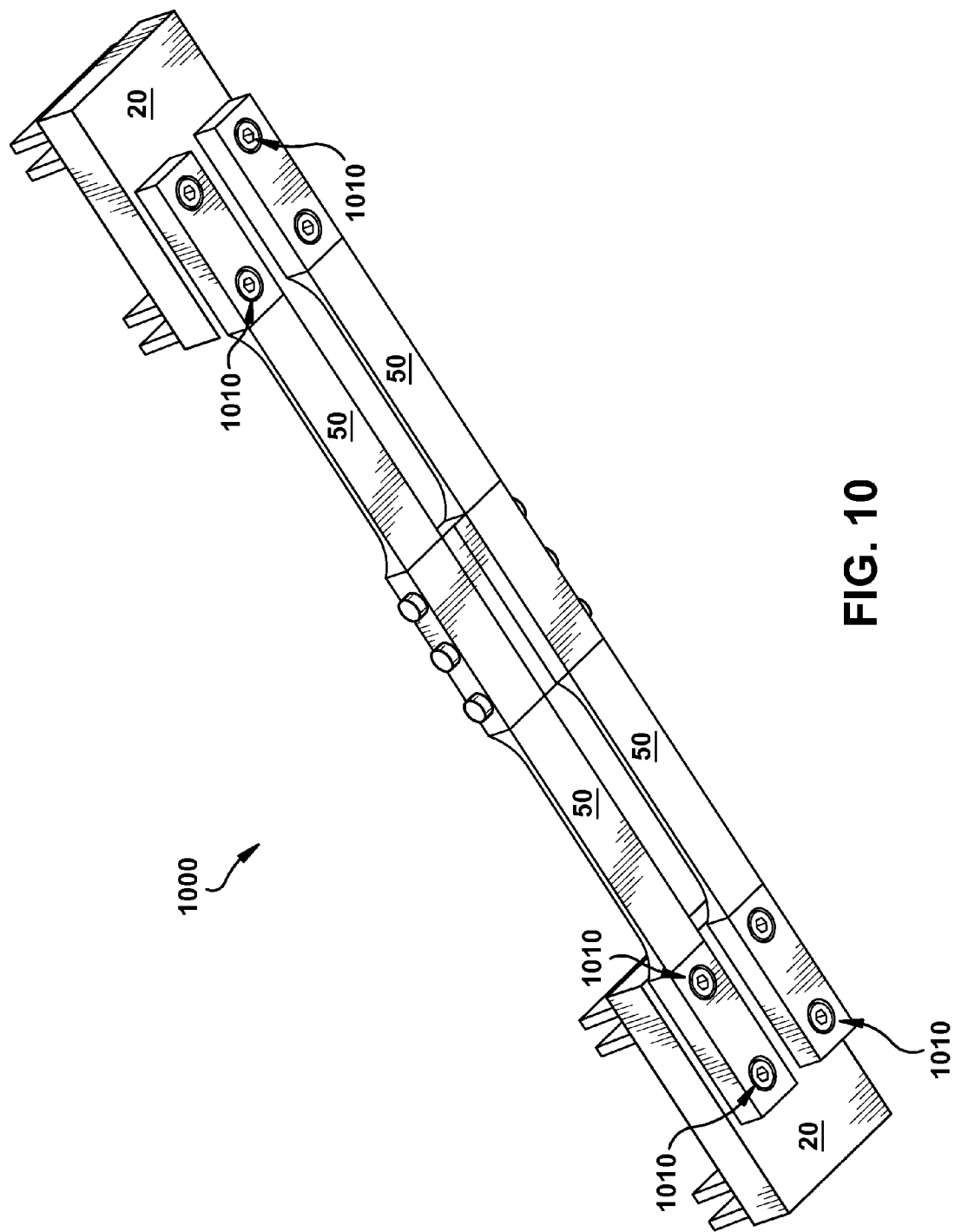
FIG. 10 shows a three-dimensional perspective view of an underside of a support system according to various additional embodiments.

FIG. 10 shows a three-dimensional perspective view of an underside of a support system 1000, similar to support system 10 in FIG. 1, with a distinct mechanism for coupling the spring bars 50 to the mounting pad 20. It is understood that like numbering between the FIGURES can represent like elements.

Returning to FIG. 10, according to various embodiments, the spring bars 50 are bolted to the mounting pad 20 with bolts 1010. in particular embodiments, each of the spring bars 50 is coupled to each mounting pad 20 with two bolts 1010. These bolts 1010 can replace the welded connection between the mounting pad 20 and spring bars 50 described with respect to the embodiments in FIG. 1.

Figure 11:
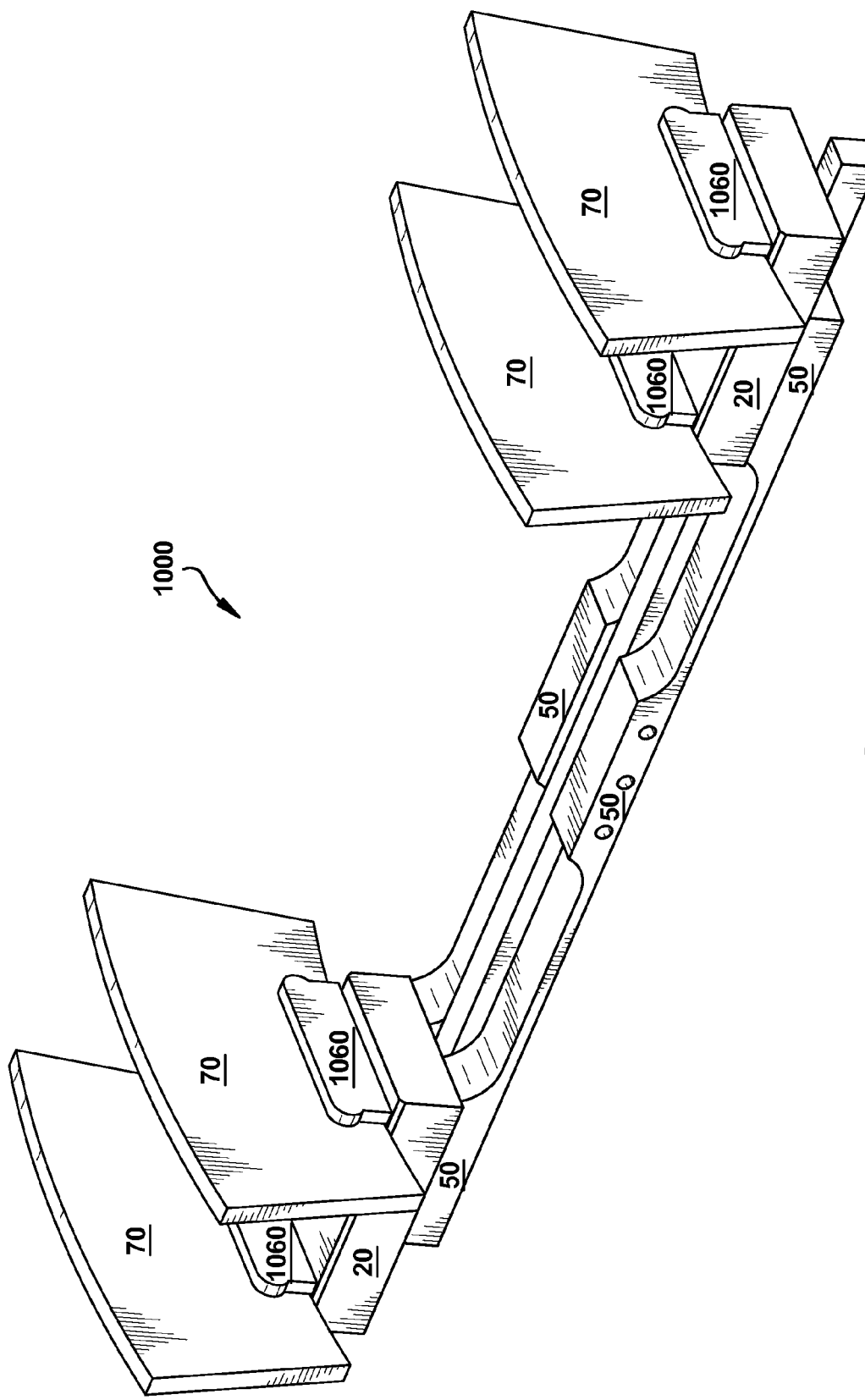
FIG. 11 shows a three-dimensional perspective view of the support system of FIG. 10.
Figure 12:
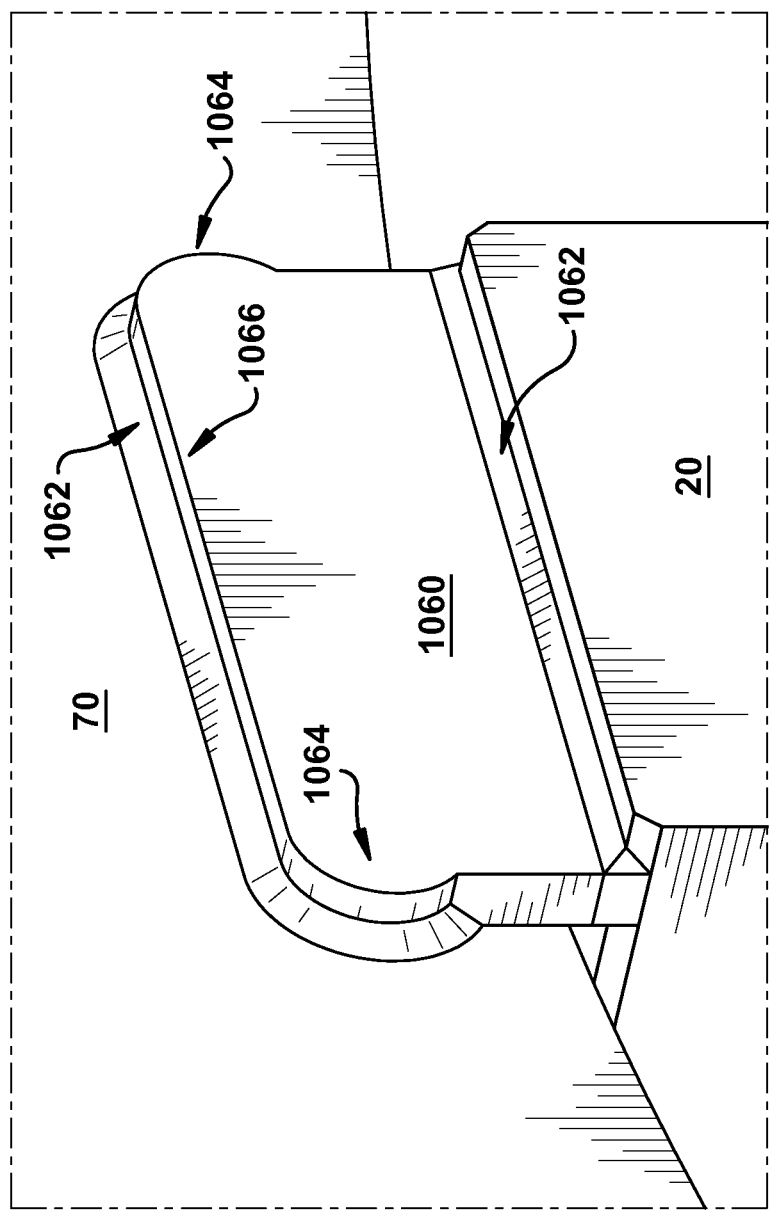
FIG. 12 shows a close-up perspective view of a section of the support system of FIGS. 10-11.

FIG. 11 shows a three-dimensional perspective view of the support system 1000, including section plates 70, shown and described with respect to various embodiments herein. In support system 1000, a set of collars (two each) 1060 is shown welded to the mounting pad 20 and each section plate 70. The collars 1060 can include straight collars which have a substantially identical (or smaller) width than the mounting pad 20, and are welded on the side of the mounting pad 20 opposite the spring bars 50. According to various embodiments, as shown in the close-up perspective view in FIG. 12, each collar 1060 can be welded (weld 1062) to the section plate 70 along corners 1064 of the collar 1060 as well as along its radially outer edge 1066.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A support system for a dynamoelectric machine, the support system comprising:
   a mounting pad having a first face and a second face;
   a pair of spring bars bolted to the mounting pad at the second face;
   a collar welded or brazed to the first face of the mounting pad,
   wherein the collar is a U-shaped collar having a longitudinal member and two perpendicular members affixed to the longitudinal member,
   wherein the two perpendicular members are welded or brazed to the mounting pad along a side of the mounting pad distinct from the first face and the second face; and
   a key bar between and affixed to the pair of spring bars.

2. The support system of claim 1, further comprising at least one shim between the key bar and one of the pair of spring bars, wherein the key bar is affixed to the pair of spring bars by at least one bolt.

3. The support system of claim 2, wherein the at least one bolt extends through a first one of the pair of spring bars, the key bar, and a second one of the pair of spring bars, respectively.

4. A support system for a dynamoelectric machine, the support system comprising:
   a mounting pad having a first face and a second face, wherein the first face is opposite the second face;
   a pair of spring bars bolted to the mounting pad at the second face;
   a section plate coupled with the mounting pad at the first face;
   a set of collars welded to the first face of the mounting pad and the section plate, the set of collars including two collars, wherein each of the two collars is welded to a distinct side of the section plate,
   wherein each of the two collars has a width, and wherein the width of each of the two collars is substantially identical to a width of the mounting pad; and
   a key bar between and affixed to the pair of spring bars.

5. The support system of claim 4, wherein each of the two collars has corners and a radially outer edge, and wherein each of the two collars is welded to the section plate along the corners and the radially outer edge.

6. A support system for a dynamoelectric machine, the support system comprising:
   a mounting pad having a first face and a second face, wherein the first face is opposite the second face;
   a pair of spring bars bolted to the mounting pad at the second face;
   a section plate coupled with the mounting pad at the first face;
   a set of collars welded to the first face of the mounting pad and the section plate, the set of collars including two collars, wherein each of the two collars is welded to a distinct side of the section plate,
   wherein each of the two collars has a width, and wherein the width of each of the two collars is smaller than a width of the mounting pad; and
   a key bar between and affixed to the pair of spring bars.

7. The support system of claim 6, wherein each of the two collars has corners and a radially outer edge, and wherein each of the two collars is welded to the section plate along the corners and the radially outer edge.

\* \* \* \* \*